United States Patent
Song et al.

(10) Patent No.: US 7,162,727 B2
(45) Date of Patent: Jan. 9, 2007

(54) OPTICAL PICKUP ACTUATOR WITH IMPROVED DAMPING EFFECT WITH END OF SUSPENSION WIRE MOVABLY INSERTED INTO GROOVE OF WIRE HOLDER

(75) Inventors: Byung-youn Song, Suwon-si (KR); Do-sun Nam, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 454 days.

(21) Appl. No.: 10/683,675

(22) Filed: Oct. 16, 2003

(65) Prior Publication Data

US 2004/0181798 A1 Sep. 16, 2004

(30) Foreign Application Priority Data

Oct. 16, 2002 (KR) ............... 10-2002-0063272

(51) Int. Cl.
G11B 7/09 (2006.01)

(52) U.S. Cl. ............................ 720/684
(58) Field of Classification Search ........... 720/684, 720/682
See application file for complete search history.

(56) References Cited

U.S. PATENT DOCUMENTS

| 5,734,638 A | * | 3/1998 | Matsui .................. 720/684 |
| 5,790,510 A | * | 8/1998 | Itoh et al. ............. 720/685 |
| 5,892,629 A | * | 4/1999 | Nishihara et al. ..... 359/814 |
| 5,933,405 A | | 8/1999 | Song .................... 720/683 |
| 6,344,936 B1 | | 2/2002 | Santo et al. .......... 359/824 |
| 2005/0195702 A1 | * | 9/2005 | Hong et al. .......... 369/44.14 |

FOREIGN PATENT DOCUMENTS

| CN | 1187001 | 7/1998 |
| GB | 2 320 792 | 7/1998 |
| JP | 11-096572 | 4/1999 |
| KR | 1998-050155 | 10/1998 |
| KR | 2000-11717 | 7/2000 |
| KR | 2001-0029820 | 4/2001 |

OTHER PUBLICATIONS

Notice of Office Action issued by Korean Patent Office on Oct. 27, 2004 during examination of a corresponding Korean application.
Chinese Office Action issued Apr. 28, 2006, in Chinese Patent Application No. 200310113875.4 which corresponds to U.S. Appl. No. 10/683,675.

(Continued)

Primary Examiner—Julie Anne Watko
(74) Attorney, Agent, or Firm—Staas & Halsey LLP

(57) ABSTRACT

An optical pickup actuator reducing an access time to a disc, and an optical recording and/or reproducing apparatus using the same. The optical pickup actuator includes a base, a wire holder on one side of the base, a bobbin on which an objective lens is placed, first and second yokes, suspension wires, and a magnetic driving unit for driving the bobbin in focusing and tracking direction. The first yoke is between one side of the bobbin and the wire holder, and the second yoke is on the other side of the bobbin. A damping member is inserted into the first yoke. One end of each of the suspension wires is fixed to the wire holder, and the other end movably supports the bobbin. Accordingly, an access time, an important performance characteristic in a high-speed optical recording and/or reproducing apparatus is reduced due to an improvement of a damping effect.

2 Claims, 10 Drawing Sheets

OTHER PUBLICATIONS

Our Proposed Amendments to the claims—marked-up copy (English Translation of Proposed Amendments to claims pending in Chinese patent application in response to Chinese Office Action).

Our Proposed Amendments to the claims—clean copy (English Translation of Proposed Amendments to claims pending in Chinese patent application in response to Chinese Office Action).

* cited by examiner

OPTICAL PICKUP ACTUATOR WITH IMPROVED DAMPING EFFECT WITH END OF SUSPENSION WIRE MOVABLY INSERTED INTO GROOVE OF WIRE HOLDER

CROSS-REFERENCE TO RELATED APPLICATIONS

This application claims the benefit of Korean Patent Application No. 2002-63272, filed on Oct. 16, 2002, in the Korean Intellectual Property Office, the disclosure of which is incorporated herein by reference.

BACKGROUND OF THE INVENTION

1. Field of the Invention

The present invention relates to an optical pickup actuator and an optical recording and/or reproducing apparatus using the same, and more particularly, to an optical pickup actuator reducing an access time to a disc by inserting a damping member into a yoke to improve a damping effect, and an optical recording and/or reproducing apparatus using the same.

2. Description of the Related Art

Access time to discs is one of most important performance characteristics of high-speed optical recording and/or reproducing apparatuses. It has been proposed that a Q factor, that is, a damping factor of optical pickup actuators, be reduced in order to reduce the access time. In general, optical pickup actuators drive optical pickups for recording and/or reproducing information on, and/or from, optical information storage media such as optical discs. Further, the optical pickup actuators perform focusing servo, and tracking servo, of the optical pickups due to an electronic interaction between a magnet and tracking coils, and an electronic interaction between the magnet and focusing coils. In other words, focusing and tracking operations of an objective lens are performed by the optical pickup actuators.

Referring to FIG. 1, in a conventional optical pickup actuator, an objective lens 42 is mounted on a bobbin 40. The bobbin 40 is movably supported by suspension wires 44a and 44b, each of which has one end fixed to a holder 14. A magnetic driving unit is provided driving the bobbin 40 in focusing and tracking directions.

The magnetic driving unit includes focusing coils 54 wound around the bobbin 40, tracking coils 52a and 52b wound perpendicularly to the focusing coils 54, and magnets 30 and 30', attached to yokes 20 and 20', opposite to the focusing coils 54 and the tracking coils 52a and 52b. If power is applied to the focusing coils 54 or the tracking coils 52a and 52b, the bobbin 40 is driven in a focusing or tracking direction due to an interaction between the magnets 30 and 30' and the focusing coils 54, or an interaction between the magnets 30 and 30' and the tracking coils 52a and 52b, so that focusing and tracking operations of the objective lens 42 are performed.

Since the bobbin 40 is suspended in the holder 14, attached to base 12 with fasteners 16a and 16b, by the suspension wires 44a and 44b in a conventional optical pickup actuator, a vibration occurs during the focusing and tracking operations of the objective lens 42 so that a long time for stably moving the objective lens 42 to a target position is required. This will be described in detail with reference to FIG. 2.

In FIG. 2, a vertical axis s indicates a moving distance of the objective lens 42 to reach a target position, and a horizontal axis t indicates a time required for moving the objective lens 42 to the target position. Ga is a line indicating an ideal movement of the objective lens 42, where, the time for the objective lens 42 to reach a target position T is "0". However, this is practically impossible because a speed (that is, a gradient of the line Ga) of the objective lens 42 would be instantaneously infinite value. Gb indicates a line describing an actual movement of the objective lens 42, where the time for the objective lens 42 to reach the target position T is "tb." If a moving speed of the objective lens 42 increases in order to reduce the time "tb," the time when the objective lens 42 reaches the target position T can be reduced from "tb" to "tc" or "td" as indicated in plots "Gc" or "Gd," respectively. However, as the moving speed of the objective lens 42 increases, vibration of the objective lens 42 increases.

As described above, the time required for moving the objective lens 42 to the target position T is a factor in determining the access time of a recording apparatus. In order to reduce the access time, attempts to reduce a Q factor have been made. Conventionally, a damper bond is injected into a holder in an attempt to reduce the Q factor.

In FIG. 1, a damper bond 60 is injected into the holder 14, and thus, damping is achieved by the damper bond 60. A damping force is determined by a relative speed v between the damper bond 60 and the suspension wires 44a and 44b, and a damping factor c. The damping force f is expressed by f=cv. If the damper bond 60 is far away from fixed points of the suspension wires 44a and 44b, displacements of the suspension wires 44a and 44b are great. Thus, the relative speed v increases, and as a result, the damping force increases. If damping is achieved at a position near the fixed points of the suspension wires 44a and 44b, the relative speed between the suspension wires 44a and 44b and the damper bond 60 is less than a moving speed of the bobbin 40, and thus, the damping force is reduced.

When the damping force increases and the Q factor decreases, the access time to a disc drive can be reduced. However, in the conventional optical pickup actuator shown in FIG. 1, since the damper bond 60 is positioned near the fixed points of the suspension wires 44a and 44b, the damping force is small. Thus, it is difficult to reduce the Q factor to 10 dB, or less, due to generation of overdamping, and thus the reduction of the access time is limited.

A method of reducing the access time, for some actuators, was developed by injecting magnetic fluid, having magnetic flux density of a proper intensity, between coils and a magnet and reducing a Q factor to a level of 0 dB.

Referring to FIG. 3, a magnetic fluid 70 is injected between a holder 14 and a bobbin 40. However, enclosing means for preventing the magnetic fluid 70 from leaking from the injected space is required. If the magnetic fluid 70 leaks, problems, such as pollution, occur frequently during manufacturing and when using the optical pickup actuator.

The above problems are more serious for a high-speed actuator. Further, a high-speed actuator uses a multipolar magnet instead of a general magnet and fine pattern coils. There is no known method for injecting magnetic fluid into a high-speed actuator having a multipolar magnet and fine pattern coils. Thus, the magnetic fluid cannot be used in the high-speed actuator.

Further, three objective lenses are frequently used in an actuator for a HD-DVD. However, as a total weight of the objective lenses is increased, DC sensitivity and AC sensitivity decrease. For example, a weight of an objective lens is about 100 mg in an actuator for a HD-DVD, while a weight of an objective lens is about 14 mg in an actuator for a CD-RW, and a weight of an objective lens is about 25 mg in an actuator for a DVD. Since the DC sensitivity and the AC sensitivity are decreased due to an increase in a weight of an objective lens, a weight of a bobbin must be reduced to compensate for the increased weight of the objective lens.

SUMMARY OF THE INVENTION

The present invention provides an optical pickup actuator reducing an access time, and preventing problems caused by leakage of a damping member, by inserting the damping member into a yoke positioned close to an optical axis of an objective lens to achieve high damping, and an optical recording and/or reproducing apparatus using the same.

According to an aspect of the present invention, an optical pickup actuator is provided comprising a base, a wire holder on one side of the base, and a bobbin on which an objective lens is placed. A first yoke is provided between one side of the bobbin and the wire holder, and a second yoke is provided on the other side of the bobbin, a damping member being inserted into the first yoke. A plurality of suspension wires each have one end fixed to the wire holder and the other end movably supporting the bobbin. A magnetic driving unit drives the bobbin in focusing and tracking directions.

According to an aspect of the present invention, the first and second yokes each have a central wall and two side walls, and through-holds are formed on the two side walls of the first yoke in a longitudinal direction of the side walls. The damping member is inserted into the through-holes, and the suspension wires pass through the damping member.

The magnetic driving unit may include focusing coils wound along a side wall of the bobbin, tracking coils wound on edges of the bobbin, and magnets attached to the first and second yokes.

According to an aspect of the invention, tracking coils are wound perpendicularly to a winding direction of the focusing coils, one portion of a first tracking coil is wound on a surface opposite to the magnets, and the other portion is wound on a surface which is not opposite to the magnets, that is, a surface adjacent to the surface on which one portion of a second tracking coil is wound.

The magnetic driving unit includes multipolar magnets, attached to the first and second yokes, and fine pattern coils, disposed in the bobbin to oppose the multipolar magnets and formed by patterning the focusing coils and the tracking coils.

According to another aspect of the present invention, an optical pickup actuator includes a base, a bobbin on which an objective lens is mounted, first and second yokes disposed symmetrically with respect to the bobbin on both sides of the bobbin, and each having a central wall and two side walls, a damping member insertable into grooves formed on each of the two side walls of the first and second yokes. First and second wire holders are formed outside the first and second yokes. The actuator includes a plurality of suspension wires each having one end fixed to the first wire holder and the other end movably supported by the second wire holder, the suspension wires passing through the damping member and movably supporting the bobbin, and a magnetic driving unit driving the bobbin in focusing and tracking directions.

According to yet another aspect of the present invention, an optical recording and/or reproducing apparatus is provided including a spindle motor rotating a disc, an optical pickup installed movably in a radial direction of the disc and recording and/or reproducing information on, and/or from, the disc, a driving unit driving the spindle motor and the optical pickup, and a controller controlling a focusing servo and a tracking servo of the optical pickup. The optical pickup includes a base, a wire holder formed on one side of the base, a bobbin on which an objective lens is mounted a first yoke between one side of the bobbin and the wire holder, and a second yoke on the other side of the bobbin, a damping member inserted into the first yoke, a suspension wire having one end fixed to the wire holder and the other end movably supporting the bobbin, and a magnetic driving unit driving the bobbin in focusing and tracking directions.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE INVENTION

Figure 1:
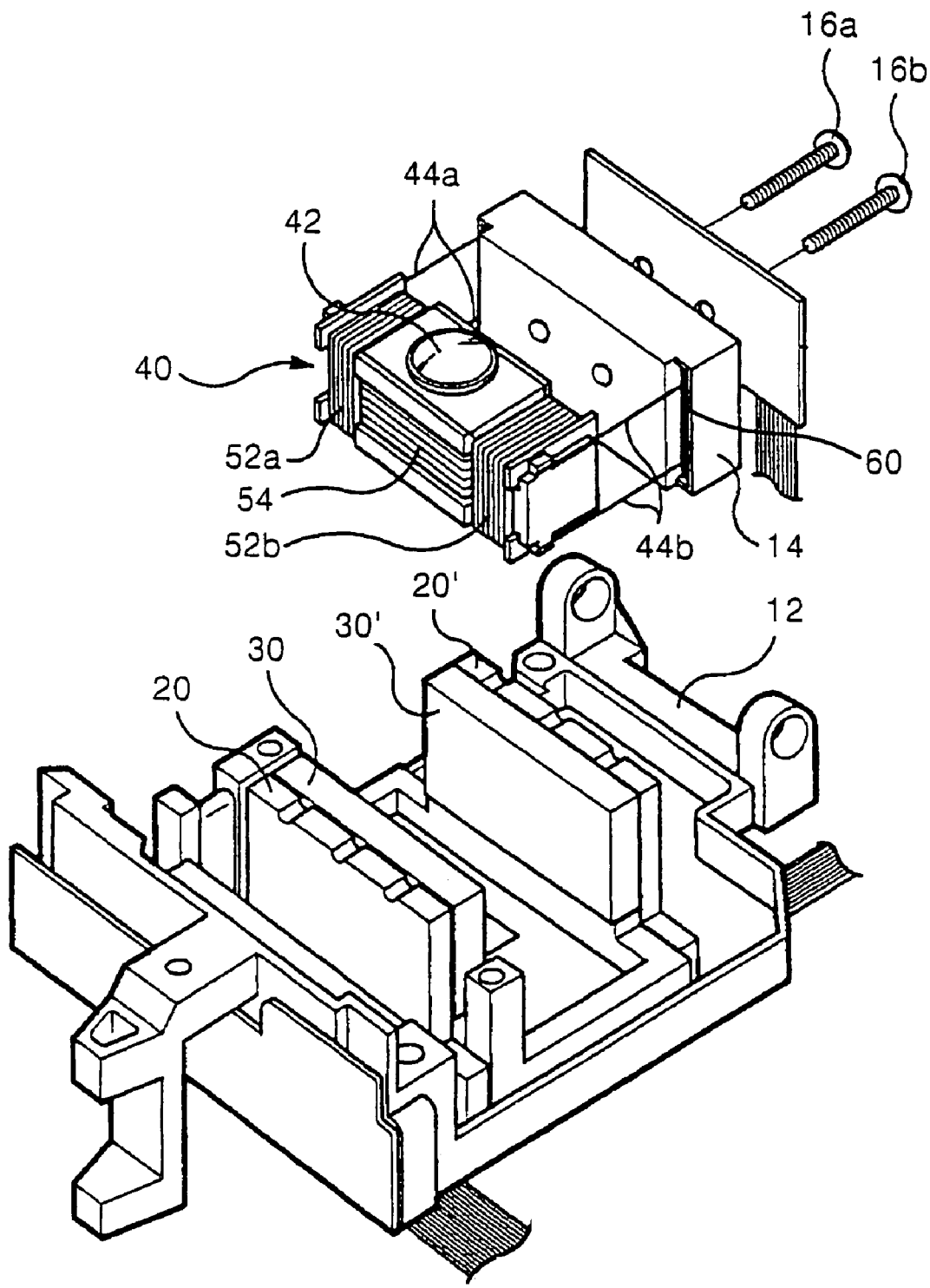
FIG. 1 is an exploded, perspective view of a conventional optical pickup actuator into which a damper bond is inserted.
Figure 2:
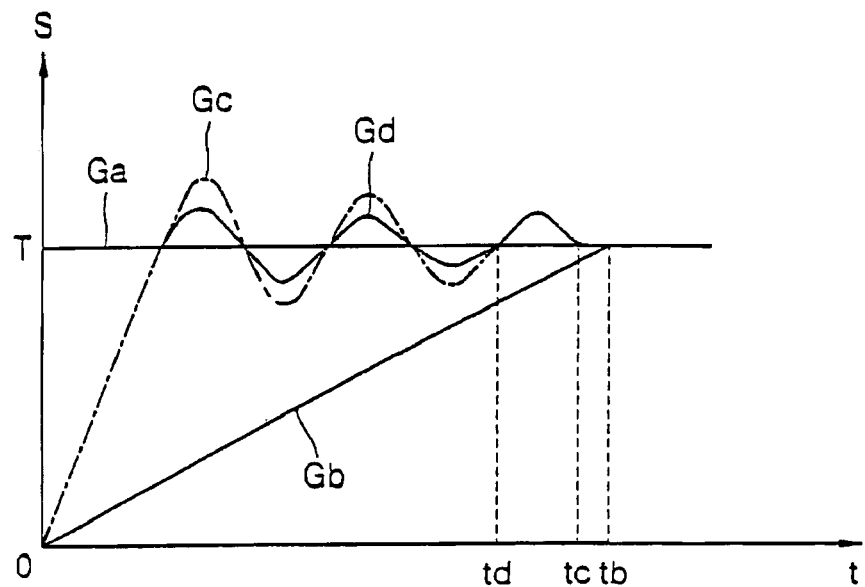
FIG. 2 illustrates a damping effect in the conventional optical pickup actuator of FIG. 1.
Figure 3:
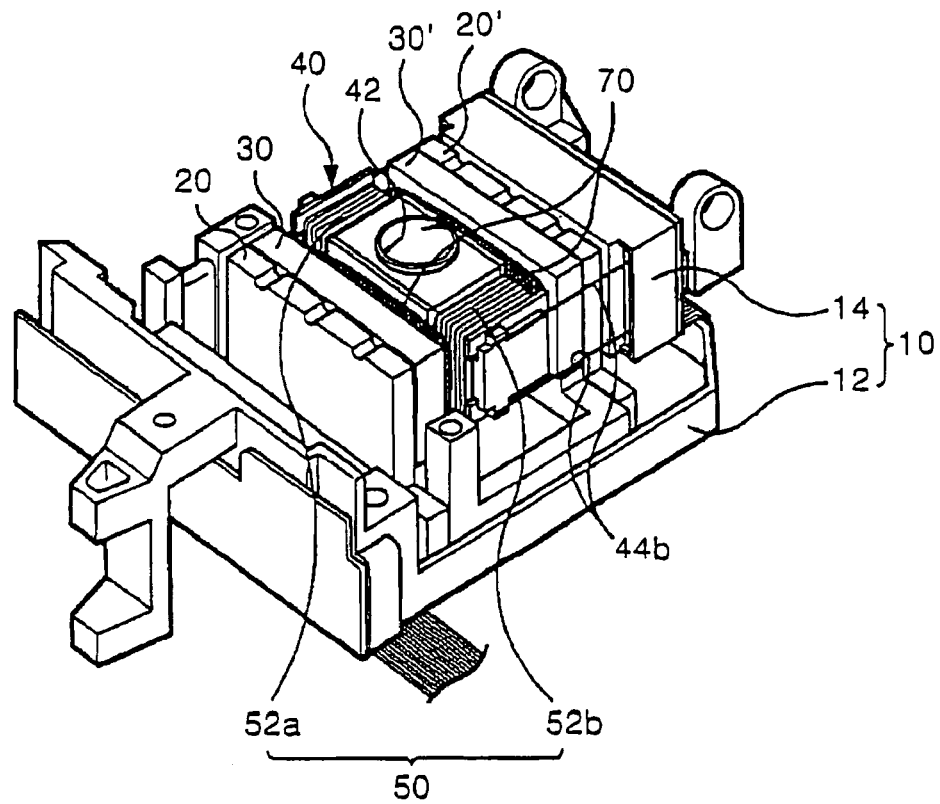
FIG. 3 is a perspective view of a conventional optical pickup actuator into which a magnetic fluid is inserted.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
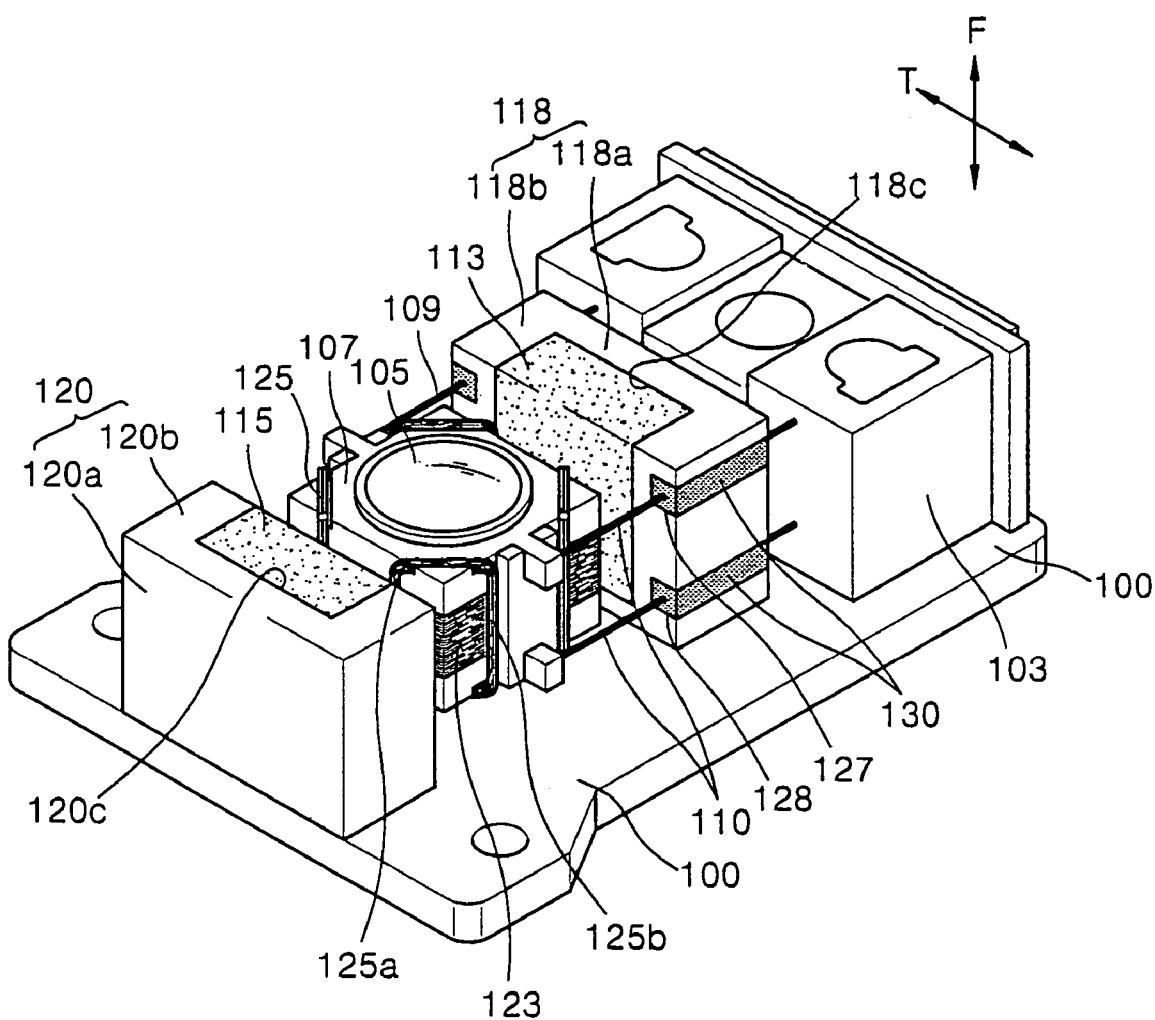
FIG. 4 is a perspective view of an optical pickup actuator according to a first embodiment of the present invention.

Referring to FIG. 4, in an optical pickup actuator according to an aspect of the present invention, a wire holder 103 is mounted on one side of a base 100, and a bobbin 107, on which an objective lens 105 is mounted, is movably supported by first and second suspension wires 109 and 110. One end of each of the first and second suspension wires 109 and 110 is fixed to the wire holder 103 and the other ends are coupled to opposite sides of the bobbin 107.

The bobbin 107 is suspended from the holder 103 by the first and second suspension wires 109 and 110 and driven in a focusing direction F and a tracking direction T, of a disc, by a magnetic driving unit, so that a movement of the objective lens 105 with respect to the disc is controlled.

Figure 5A:
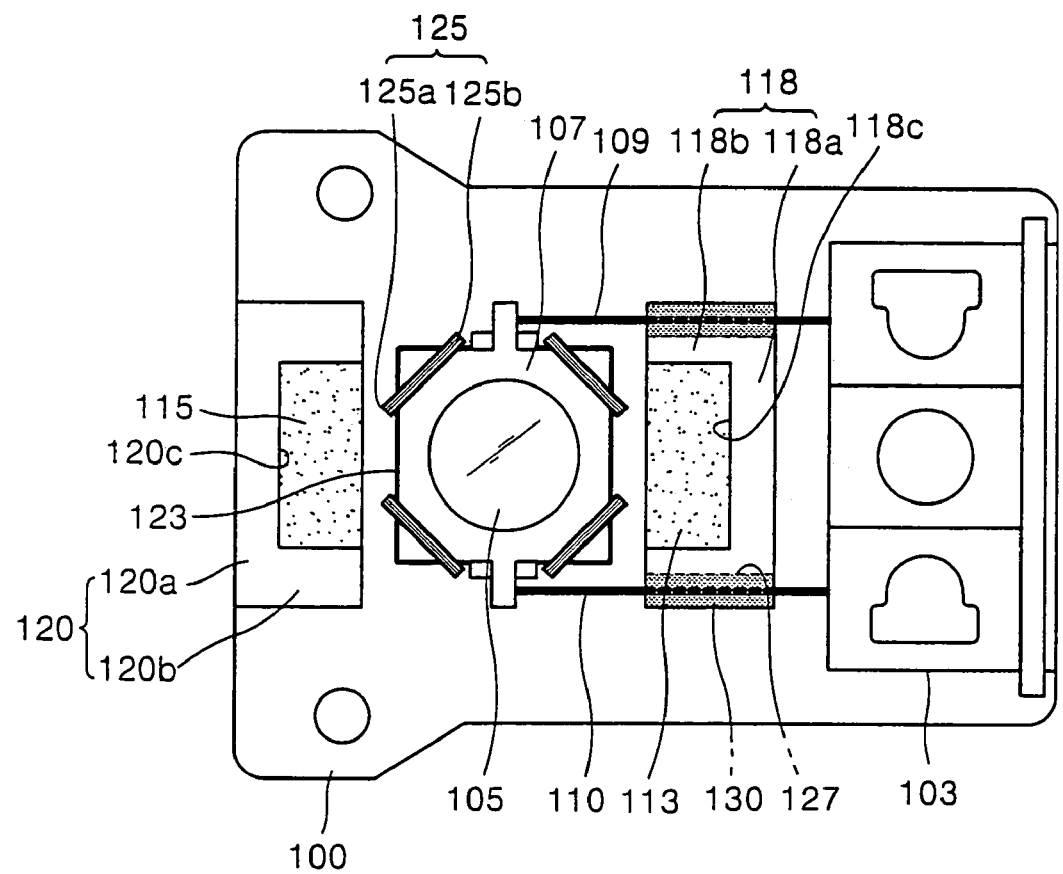
FIG. 5A is a plan view of FIG. 4.
Figure 5B:
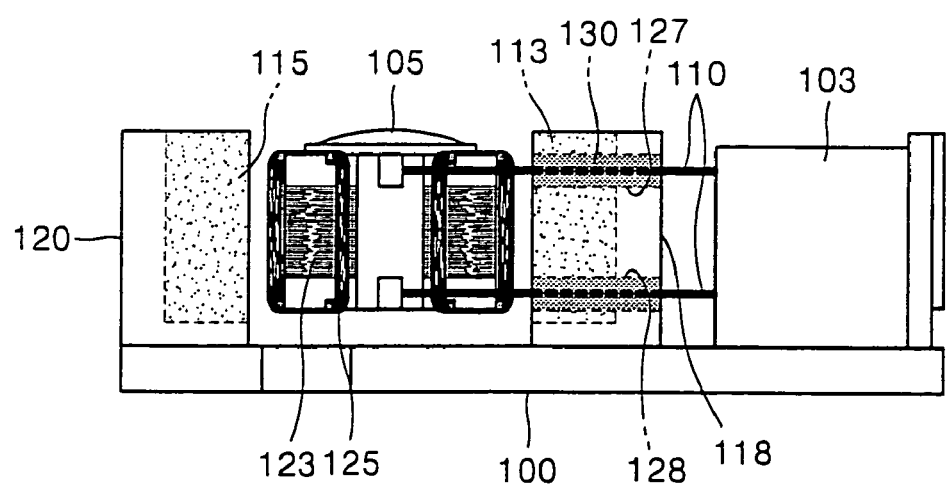
FIG. 5B is a front view of FIG. 4.

Referring to FIGS. 5A and 5B, the magnetic driving unit includes first and second magnets 113 and 115 provided at both sides of the bobbin 107, interposed therebetween, and opposing each other, and focusing coils 123 and tracking coils 125 wound on the bobbin 107. The focusing coils 123, for example, are wound around the bobbin 40, and the tracking coils 125 are wound perpendicularly to a winding direction of the focusing coils 123 at each of edges of the bobbin 40. When power is applied to the focusing coils 123 and the tracking coils 125, the bobbin 40 is driven in the focusing and tracking direction due to an interaction between the first and second magnets 113 and 115 and the focusing coils 123 and the tracking coils 125.

The tracking coils 125 are wound over adjacent sides of the bobbin 107, at each of the edges of the bobbin 107. One portion 125a, of the tracking coils 125, opposing the first and second magnets 113 and 115, is an effective coil contributing to a tracking operation of the bobbin 107. The other portion 125b does not contribute to the tracking operation of the bobbin 107. That is, only the effective coil portion 125a contributes to the tracking operation of the bobbin 107. Only the effective coil portion 125a is wound on one side of the bobbin 107 and the other portion 125b is wound on the other side of the bobbin 107, so that a space required for installing the tracking coil 125 can be reduced. Thus, a volume and a weight of the bobbin 107 can be reduced. DC sensitivity and AC sensitivity of the bobbin 107 can be increased due to the reduction of the weight of the bobbin 107.

The first and second magnets 113 and 115 are attached to first and second yokes 118 and 120. The first and second yokes 118 and 120 guide a magnetic path of lines of magnetic force, generated from the first and second magnets 113 and 115, into a direction so as to increase an efficiency of the magnets 113 and 115. The first and second yokes 118 and 120 have central walls 118a and 120a and side walls 118b and 120b, and are formed in a shape of a "⊏" as shown in FIG. 5A. The first and second magnets 113 and 115 are inserted into central grooves 118c and 120c of the first and second yokes 118 and 120, respectively.

First and second through-holes 127 and 128 pass through the side wall 118b of the first yoke 118, disposed between the wire holder 103 and the bobbin 107, in a longitudinal direction of the side wall 118b. According to an aspect of the invention, the first and second through-holes 127 and 128 are provided as a passage for the second suspension wire 110. The first and second through-holes 127 and 128 are filled with a damping member 130 having a high viscosity, and the second suspension wire 110 passes through the damping member 130. Similar through-holes and damping member are provided for the first suspension wire 109.

Since a material having high viscosity is used as the damping member 130, the damping member 130 is prevented from flowing, or leaking, out of the first and second through-holes 127 and 128. For example, a non-reaction bond, which hardens without UV irradiation, is used as the damping member 130.

Figure 6:
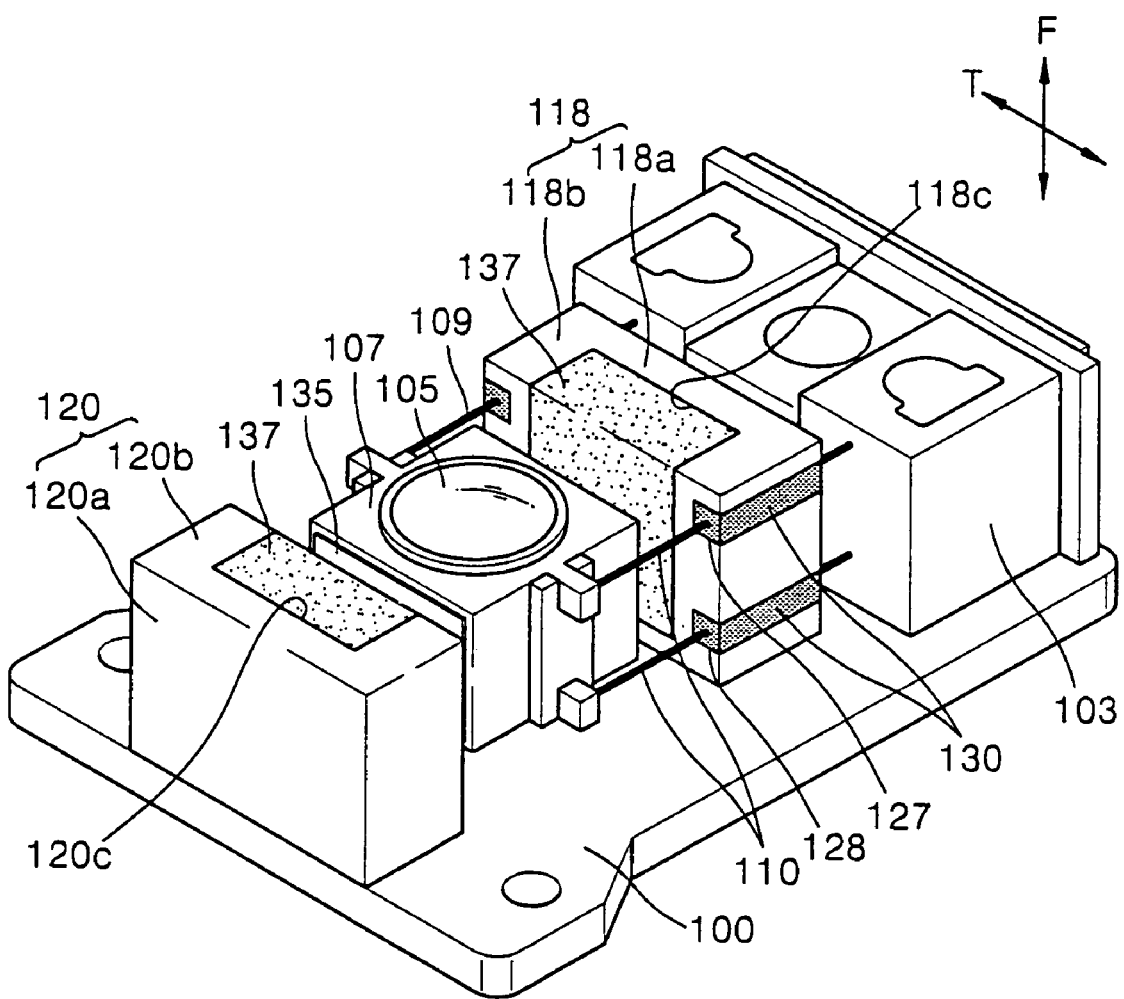
FIG. 6 shows the optical pickup actuator according to an aspect of the present invention in which fine pattern coils and a multipolar magnet are included.

Although the magnetic driving unit includes a general magnet and winding coils in an aspect of the present invention, the magnetic driving unit is not limited thereto. For example, the magnetic driving unit may include a multipolar magnet and fine pattern coils. Referring to FIG. 6, multipolar magnets 137 may be attached to the first and second yokes 118 and 120. Fine pattern coils 135, formed by patterning focusing coils and tracking coils, may be disposed in the bobbin 107 to oppose the multipolar magnets 137. In FIG. 6, the same reference numerals as those in FIG. 4 represent the same elements, and thus their descriptions will be omitted.

According to the damping structure of the optical pickup actuator according to an aspect of the present invention, since the damping member 130 is inserted into the first yoke 118, the damping structure of the optical pickup actuator according to the present invention can be applied to a magnetic circuit including a multipolar magnet and fine pattern coils.

An operational effect of the optical pickup actuator according to the present invention will now be described.

If power is applied to the optical pickup actuator, current flows in the focusing coils 123 or the tracking coils 125 through the first and second suspension wires 109 and 110. The first and second suspension wires 110 movably support the bobbin 107, and also operate as electric wires. The objective lens 105 and the bobbin 107 operate due to an electromagnetic interaction between the focusing coils 123, or the tracking coils 125, and the first and second magnets 113 and 115. The focusing and tracking operations of the objective lens 105 and the bobbin 107 are determined by a direction of a current flowing through the focusing coils 123 and the tracking coils 125, and a direction of lines of magnetic force generated by the first and second magnets 113 and 115. When the bobbin 107 performs the focusing or tracking operation, the bobbin 107 vibrates, because the bobbin 107 is suspended by the first and second suspension wires 109 and 110. A predetermined time for stably stopping the bobbin 107 is required due to the vibration.

Figure 7A:
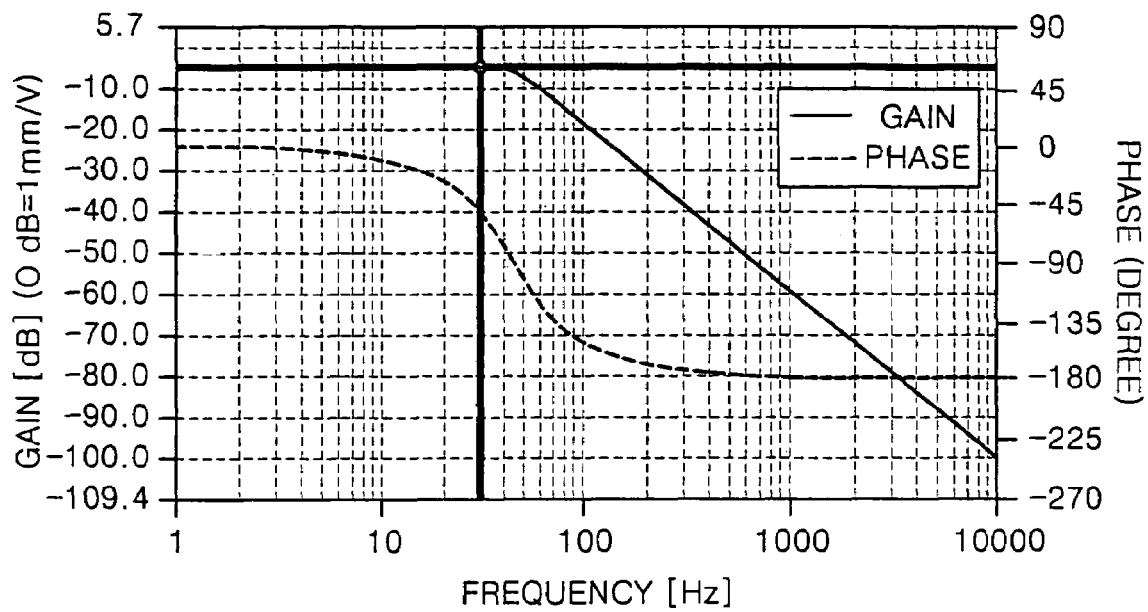
FIGS. 7A and 7B are graphs showing a damping effect in the optical pickup actuator.
Figure 7B:
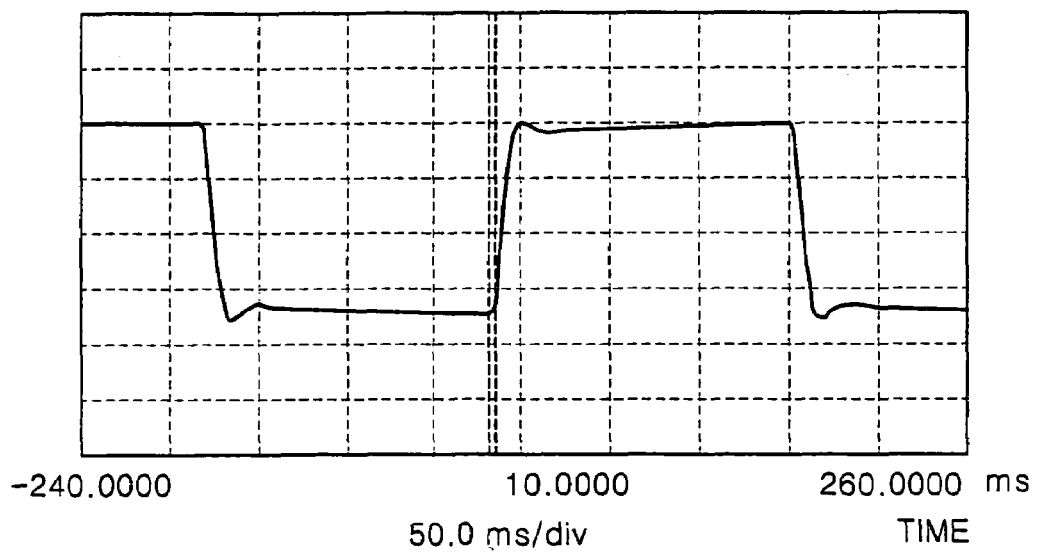

FIGS. 7A and 7B are graphs showing a damping effect in the optical pickup actuator. FIG. 7A shows gain and phase versus frequency. In FIG. 7A, a dotted line indicates phase, and a solid line indicates gain. FIG. 7B shows a vibration mode in the focusing and tracking operations of the bobbin 107, that is, changes in the position of the bobbin 107 with time.

Figure 8A:
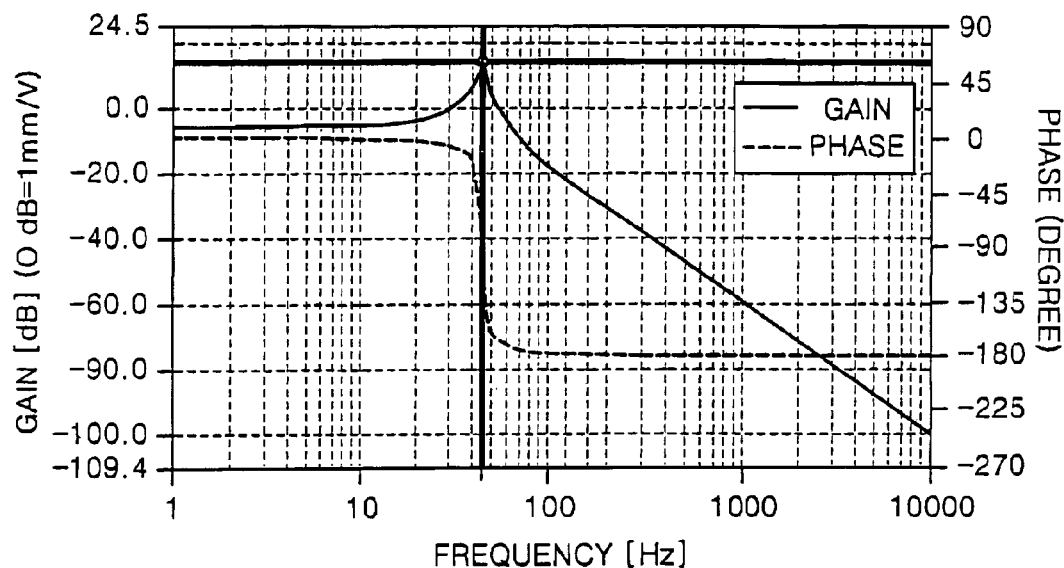
FIGS. 8A and 8B are graphs showing a damping effect in the conventional optical pickup actuator of FIG. 1.
Figure 8B:
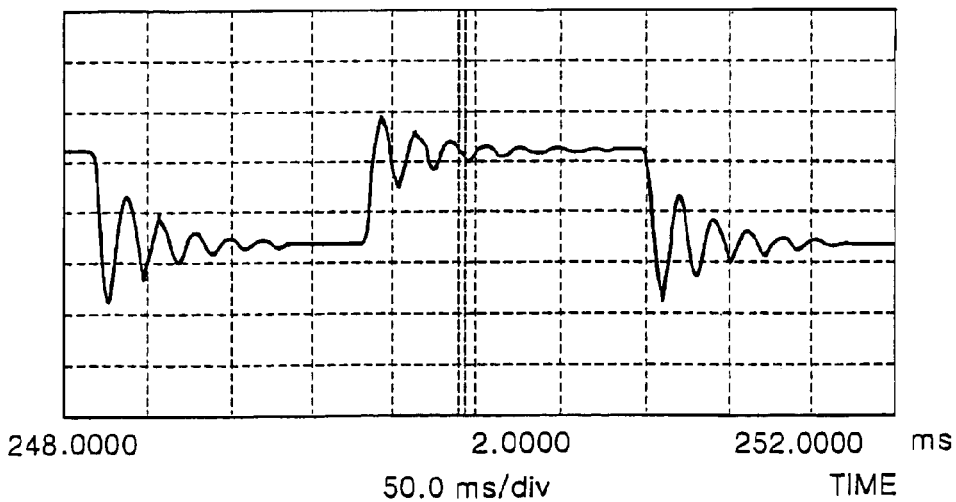

FIGS. 8A and 8B are graphs showing a damping effect in the conventional optical pickup actuator of FIG. 1. FIG. 8A shows gain and phase when the damper bond 60 is inserted into the holder 14. Comparing FIG. 7A with FIG. 8A, it can be seen that a damping effect in the optical pickup actuator according to the present invention is superior to that in the conventional optical pickup actuator. More specifically, a value of a Q factor is determined by a difference between a gain value at 1 Hz and a peak gain value in a gain curve. As shown in the gain curve shown FIG. 7A, a value of a Q factor is approximately 0 dB. As shown in the gain curve shown in FIG. 8A, a value of a Q factor is approximately 20 dB. It can be seen from the comparison result that the Q factor in the present invention is greatly reduced compared with the Q factor in the prior art, so that an access time of the bobbin according to the present invention is also greatly reduced.

Comparing FIG. 7B with FIG. 8B, it can be seen that it takes a long time to stabilize the movement of the suspension wires due to overdamping in the conventional optical pickup actuator. However, a time for stabilizing the movement of the suspension wires in the optical pickup actuator, according to the present invention, is greatly reduced compared with the conventional optical pickup actuator.

Figure 9:
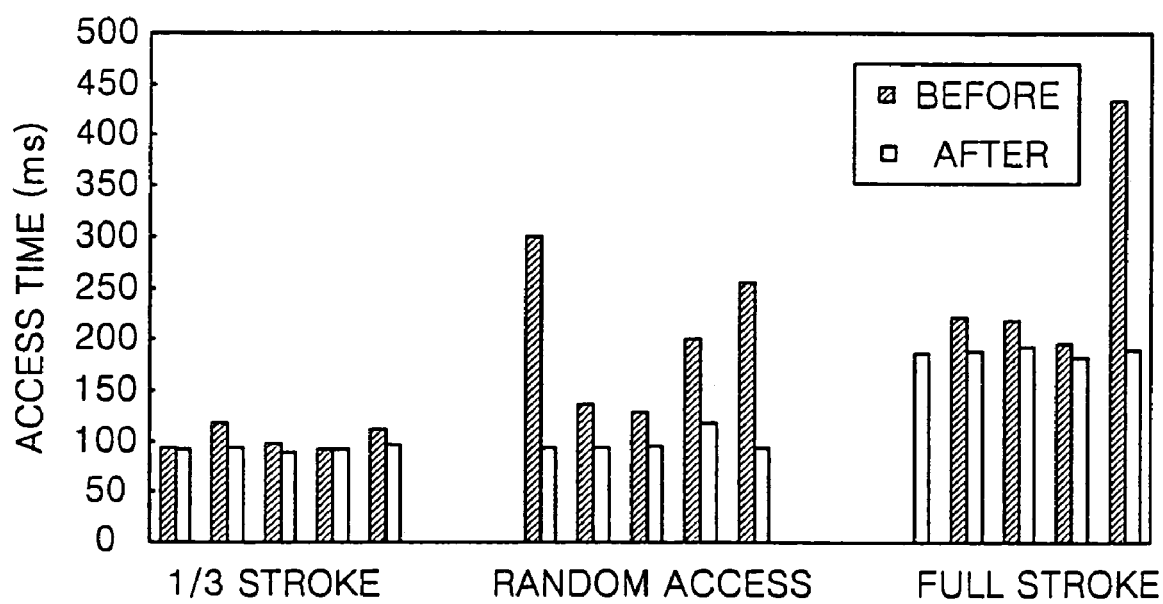
FIG. 9 is a graph showing an access time before, and after, inserting a damping member into the optical pickup actuator.

FIG. 9 is a graph showing an access time before, and after, inserting the damping member 130 into the optical pickup actuator. Here, "⅓ stroke" indicates that the optical pickup actuator moves within ⅓ of a width of the disc in the tracking direction of the disc. "Full stroke" indicates that the optical pickup actuator moves sequentially within the whole width of the disc in the tracking direction. "Random access" indicates that the optical pickup actuator accesses randomly without limitation of a movement range.

It can be seen from FIG. 9 that the access time of the optical pickup actuator after inserting the damping member 13 is reduced in all cases: ⅓ stroke, full stroke, and random access. In particular, the access time is greatly reduced in the case of random access.

Figure 10A:
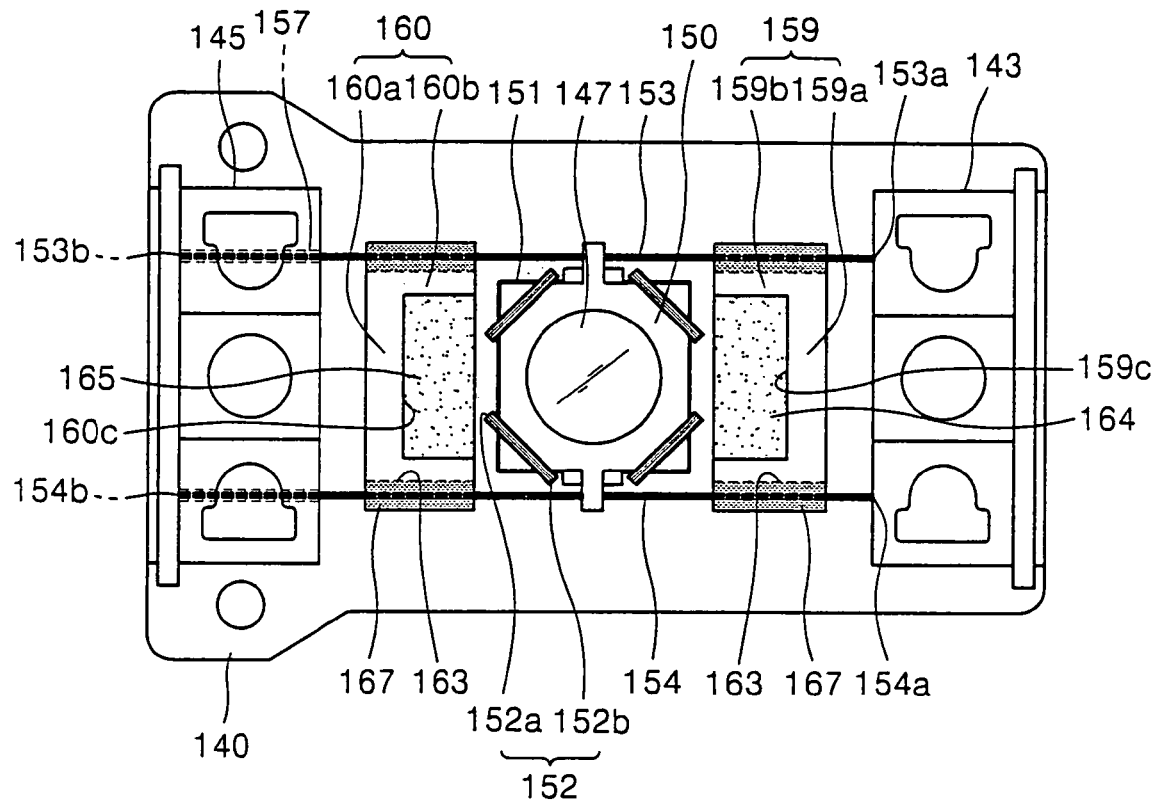
FIG. 10A is a plan view of an optical pickup actuator according to a second embodiment of the present invention.
Figure 10B:
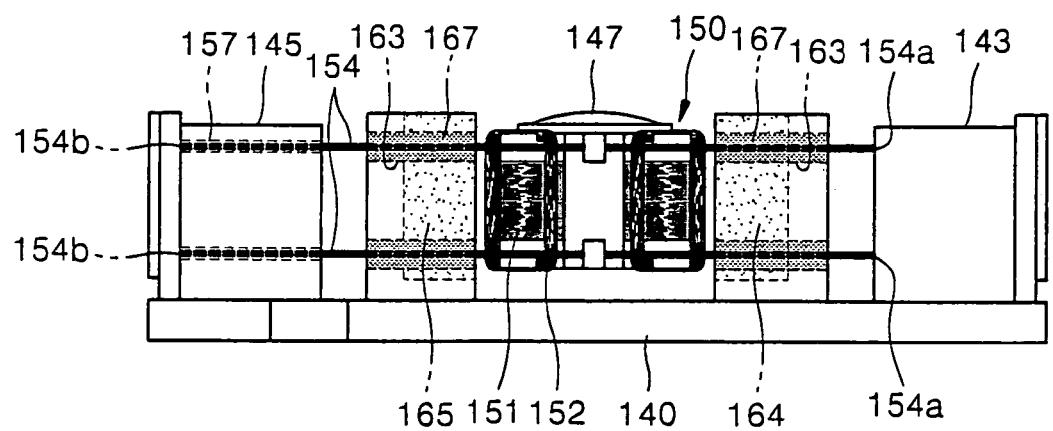
FIG. 10B is a front view of FIG. 10A.

Next, referring to FIGS. 10A and 10B, in an optical pickup actuator according to an aspect of the present invention, first and second wire holders 143 and 145 are provided on both sides of a base 140, and a bobbin 150, on which an objective lens 147 is mounted is movably supported by first and second suspension wires 153 and 154.

One end of each of the first and second suspension wires 153 and 154 is fixed to the first wire holder 143 and is fixed ends 153a and 154a. Each of the other ends is movably inserted into grooves 157 formed on the second wire holder 145 and is free ends 153b and 154b. The bobbin 150 is symmetrically supported by the first and second suspension wires 153 and 154.

First and second yokes 159 and 160 are provided between the bobbin 150 and the first and second wire holders 143 and 145, respectively. The first and second yokes 159 and 160 each have central walls 159a and 160a, respectively and two side walls 159b and 160b, respectively. Central grooves 159c and 160c are formed in the central walls 159a and 160a, and the two side walls 159b and 160b. First and second magnets 164 and 165 are inserted into the central grooves 159c and 160c, respectively, and fixed thereto.

Through-holes 163 are in two side walls 159b and 160b of the first and second yokes 159 and 160, respectively. Damping members 167 are inserted into the through-holes 163, and the first and second suspension wires 153 and 154 pass through the damping members 167.

Focusing coils 151 and tracking coils 152, wound on the bobbin 150, are provided. The bobbin 150 is driven due to an interaction between the first and second magnets 164 and 165 and the focusing coils 151 and the tracking coils 152. The focusing coils 151 are wound along a side wall of the bobbin 150, and the tracking coils 152 are wound at each of edges of the bobbin 150. The tracking coils 152 are wound as previously described. That is, the tracking coils 152 include an effective coil portion 152a and an ineffective coil portion 152b. The effective coil portion 152a is disposed on a surface of the bobbin 150 opposing the first and second magnets 164 and 165. The ineffective coil portion 152b is disposed on a surface that is not facing the first magnet 164 or the second magnet 165, that is, a surface adjacent to the surface on which the effective coil portion 152a is formed. Thus, a volume and a weight of the bobbin 107 can be reduced.

Further, a magnetic driving unit of the optical pickup actuator according to the above described of the present invention may also include a multipolar magnet and fine pattern coils.

Since the first and second suspension wires 153 and 154 are disposed symmetrically with respect to the bobbin 150, the number of occurrences of a sub-vibration in a pitching mode is reduced.

Figure 11:
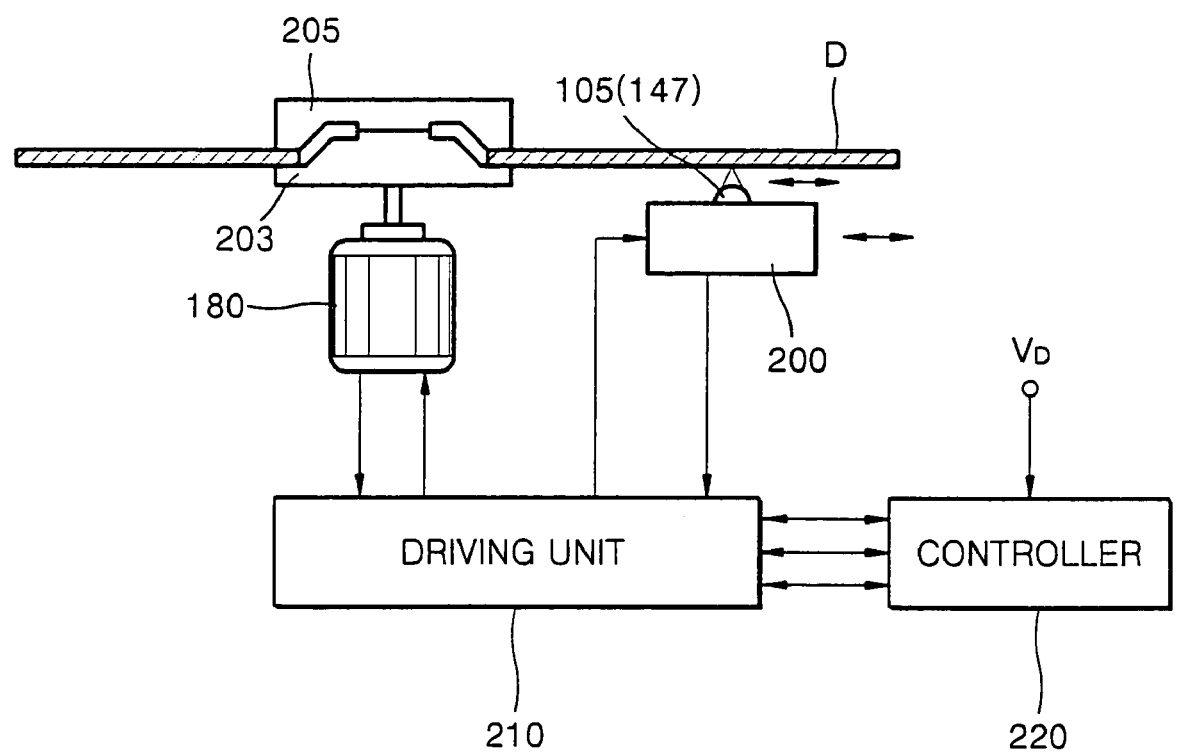
FIG. 11 schematically shows a structure of an optical recording and/or reproducing apparatus according to the present invention.

Referring to FIG. 11, in an optical recording and/or reproducing apparatus using the optical pickup actuator according an aspect of the present invention, a spindle motor 180 for rotating a disc D is installed under a turntable 203, the disc D is placed on the turntable 43, and a clamp 205, holding the disc D by an electromagnetic force generated by an interaction between the disc D and the turntable 203, is installed opposite to the turntable 203. When the disc D is rotated by the spindle motor 180, an optical pickup 200, movable in a radial direction of the disc D, records information on the disc D, or reproduces the information recorded on the disc.

The spindle motor 180 and the optical pickup 200 are driven by a driving unit 210. A focusing servo and tracking servo of the optical pickup 200 are controlled by a controller 220 so that information recording, and/or reproduction, on and/or from the disc D are performed. The optical pickup 200 includes an optical system having objective lenses 105 and 147 and an actuator for driving the objective lenses 105 and 147 in focusing and tracking directions.

A photoelectric transformation signal detected through the optical pickup 200 is input to the controller 220 through the driving unit 210. The driving unit 210 controls a rotation speed of the spindle motor 180, amplifies the input photoelectric transformation signal, and drives the optical pickup 200. The controller 220 sends focusing servo instructions, and tracking servo instructions, adjusted based on the photoelectric transformation signal input from the driving unit 210 to the driving unit 210 so that the focusing servo and the tracking servo are performed.

The optical pickup 200 uses the optical pickup actuator according to an aspect of the present invention, as shown in FIG. 4. The optical pickup actuator, as shown in FIG. 4, obtains a large damping effect by inserting the damping member 130 into the yoke 118 disposed between the holder 103b and the bobbin 107.

The optical pickup 200 may alternatively include the optical pickup actuator according to the aspect of the present invention, as shown in FIG. 10A. The optical pickup actuator, as shown in FIG. 10A, obtains a large damping effect by symmetrically disposing the suspension wires 153 and 154 with respect to the bobbin 150, and inserting the damping member 167 into the first and second yokes 159 and 160, disposed on both sides of the bobbin 150.

With the optical pickup actuator having the above structure, the damping effect of the optical pickup actuator increases during recording, and/or reproducing, information on, and/or from, the disc D, and the access time to the disc D is reduced. Thus, the optical pickup actuator according to the present invention can be applied to a high-speed optical recording and/or reproducing apparatus.

As described above, since a damping member with high viscosity is inserted into a yoke in an optical pickup actuator, according to an aspect of the present invention, so that a damping effect is improved, the access time, which is an important characteristic of a high-speed optical recording and/or reproducing apparatus, can be reduced. Conventionally, magnetic fluid cannot be used in a high-speed optical pickup actuator having fine pattern coils and a multipolar magnet. However, although the optical pickup actuator, according to an aspect of the present invention uses magnetic fluid, the optical pickup actuator, according to the present invention, can be applied to a high-speed optical pickup actuator having fine pattern coils and a multipolar magnet. That is, the optical pickup actuator, according to aspects of the present invention, has a wide range of use.

Further, conventionally, DC sensitivity and AC sensitivity are reduced due to an increase of a weight of an objective lens in an actuator for a HD-DVD. However, since a weight of a bobbin is reduced by the improvement of a winding arrangement of coils in the optical pickup actuator, according to the present invention, DC sensitivity and AC sensitivity are improved, and recording, and/or reproducing, performance is improved.

Furthermore, since components of a magnetic circuit are disposed symmetrically with respect to the bobbin, sub-vibration in a pitching mode is suppressed.

Although a few embodiments of the present invention have been shown and described, it would be appreciated by those skilled in the art that changes may be made in this embodiment without departing from the principles and spirit of the invention, the scope of which is defined in claims and their equivalents.

What is claimed is:

1. An optical pickup actuator for an objective lens, comprising:
    a base;
    a bobbin holding the objective lens;
    first and second yokes disposed symmetrically with respect to the bobbin installed on both sides of the bobbin, and each having a central wall and two side walls;
    a damping member insertable into grooves in each of the two side walls of the first and second yokes;
    first and second wire holders installed outside the first and second yokes;
    a plurality of suspension wires, each having one end fixed to the first wire holder and an other end supported movably by the second wire holder, the suspension wires passing through the damping member and movably supporting the bobbin; and
    a magnetic driving unit driving the bobbin in focusing and tracking directions,
    wherein a plurality of grooves are formed in the second wire holder, each suspension wire corresponds to one of the grooves formed in the second wire holder, and an end of each suspension wire is movably inserted into one of the grooves of the second wire holder.

2. An optical pickup actuator for an objective lens, comprising:
    a base;
    a plurality of wire holders installed on the base;
    a bobbin holding the objective lens;
    a plurality of suspension wires, each of the wires having one end fixed to one of wire holders and an other end supported movably by another wire holder, and movably supporting the bobbin;
    a plurality of substantially U-shaped yokes disposed symmetrically with respect to the bobbin;
    a damping member insertable into a grooves in each a wall of the yokes, the suspension wire passing through the damping member; and
    a magnetic driving unit driving the bobbin in focusing and tracking directions, wherein a plurality of grooves are formed in the another wire holder, each suspension wire corresponds to one of the grooves formed in the another wire holder, and an end of each suspension wire is movably inserted into one of the grooves of the another wire holder.

* * * * *